(12) United States Patent
Patrick

(10) Patent No.: US 11,730,087 B2
(45) Date of Patent: *Aug. 22, 2023

(54) METHOD AND APPARATUS FOR AIRBORNE DISSEMINATION AND IMPLANTATION OF SEEDS

(71) Applicant: Brett Evan Patrick, Grants Pass, OR (US)

(72) Inventor: Brett Evan Patrick, Grants Pass, OR (US)

(73) Assignee: Brett Patrick, Grants Pass, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,873

(22) Filed: Apr. 11, 2022

(65) Prior Publication Data

US 2022/0264808 A1 Aug. 25, 2022

Related U.S. Application Data

(63) Continuation of application No. 16/030,680, filed on Jul. 9, 2018, now Pat. No. 11,304,380.

(Continued)

(51) Int. Cl.
*A01G 9/029* (2018.01)
*B64D 1/08* (2006.01)
(Continued)

(52) U.S. Cl.
CPC ............ *A01G 9/0291* (2018.02); *A01C 21/00* (2013.01); *B64D 1/08* (2013.01); *G05D 1/0204* (2013.01);
(Continued)

(58) Field of Classification Search
CPC .. A01G 9/0291; A01G 9/0293; A01G 9/0299; A01G 24/44; B64D 1/08;
(Continued)

(56) References Cited

U.S. PATENT DOCUMENTS 643,524 A 2/1900 Newman
1,439,601 A 12/1922 Boop
(Continued)

FOREIGN PATENT DOCUMENTS

EP 2106682 A1 * 10/2009 ............. A01C 11/00
EP 2106682 A1 10/2009
(Continued)

OTHER PUBLICATIONS https://www.youtube.com/watch?v=plfWt7Y4dLQ "Seed Bombing: How Thailand Plans To Restore Its Forests"—May 1, 2016 (Year: 2016).*

(Continued)

*Primary Examiner* — Peter M Poon
*Assistant Examiner* — Danielle A Clerkley
(74) *Attorney, Agent, or Firm* — Chernoff Vilhauer, McClung & Stenzel, LLP

(57) ABSTRACT

This invention relates to a method and apparatus for the airborne dissemination and implantation of seeds utilizing an aerodynamic seed delivery apparatus with built-in nutrients, anti-pest, and anti-fungal properties that can be disseminated rapidly from an airborne platform. The velocity of impact and depth of penetration into specific soil types by the delivery apparatus can be controlled up to a terminal velocity kinetic energy by exploiting a specified drag coefficient, mass, and altitude of release. The seeds are delivered and imbedded into the soil at the optimal depth and orientation to maximize germination rates, since seed orientation has a pronounced effect on germination and sprout mortality rates. Flight paths for Unmanned Aerial Vehicles (UAVs) utilized for dissemination can be automated to adjust coordinates based on wind vectors, terrain elevation data, and soil permeability data to efficiently achieve a desired penetration depth across a specified geographic area.

11 Claims, 5 Drawing Sheets

Related U.S. Application Data

(60) Provisional application No. 62/534,917, filed on Jul. 20, 2017.

(51) Int. Cl.
*G05D 1/02* (2020.01)
*A01C 21/00* (2006.01)
*B64U 101/00* (2023.01)

(52) U.S. Cl.
CPC ...... *B64U 2101/00* (2023.01); *B64U 2201/10* (2023.01)

(58) Field of Classification Search
CPC ... B64D 1/12; B64D 1/00; B64D 1/02; B64D 1/16; B64D 1/18; A01C 21/00; A01C 21/002; A01C 21/005; A01C 21/007; B64U 2101/00; B64U 2101/40
USPC ............. 47/57.6, 1.01, 58.1 SE, 59 S, 73, 74
See application file for complete search history.

(56) References Cited

U.S. PATENT DOCUMENTS

| | | | |
|---|---|---|---|
| 2,588,184 | A | 3/1952 | Walsh |
| 2,865,315 | A | 8/1954 | Goldstein |
| 2,984,439 | A | 5/1961 | Fletcher |
| 3,181,269 | A | 5/1965 | Nixon |
| 3,273,284 | A | 9/1966 | Anagnostou |
| 3,755,962 | A | 9/1973 | Walters et al. |
| 3,914,900 | A | 10/1975 | Bigelow et al. |
| 3,973,355 | A | 8/1976 | McKenzie |
| 4,008,544 | A | 2/1977 | Rupprecht et al. |
| 4,031,832 | A | 9/1977 | Edwards |
| 4,186,670 | A | 2/1980 | Hanger |
| 4,216,621 | A | 8/1980 | Olsen et al. |
| 4,333,265 | A * | 6/1982 | Arnold ............... B64D 1/10 221/92 |
| 4,620,871 | A | 11/1986 | Grega née Tóth et al. |
| 4,934,288 | A | 6/1990 | Kusiak et al. |
| 5,031,356 | A | 7/1991 | Thomsen |
| 5,170,729 | A | 12/1992 | Benner |
| 5,924,369 | A | 7/1999 | Hatcher |
| 6,185,864 | B1 | 2/2001 | Lee |
| 6,279,496 | B1 | 8/2001 | Mitchell et al. |
| 6,510,805 | B2 | 1/2003 | Fima et al. |
| 6,516,565 | B1 * | 2/2003 | Fima ............... B64D 1/16 47/84 |
| 6,752,682 | B1 | 6/2004 | Ferrrel |
| 6,832,604 | B1 | 12/2004 | Thompson |
| 7,322,546 | B2 | 1/2008 | Snow, Jr. et al. |
| 7,992,345 | B2 | 8/2011 | Chun |
| 8,449,898 | B2 | 5/2013 | Gregory et al. |
| 9,382,003 | B2 | 7/2016 | Burema et al. |
| 9,504,250 | B2 | 11/2016 | Ogawa et al. |
| 9,650,136 | B1 | 5/2017 | Haskin et al. |
| 9,676,481 | B1 | 6/2017 | Buchmueller |
| 9,703,295 | B1 | 7/2017 | Neal et al. |
| 9,930,827 | B2 * | 4/2018 | Camacho ............... A01C 1/04 |
| 10,773,803 | B2 * | 9/2020 | Qiu ............... B64D 1/02 |
| 2007/0122438 | A1 | 5/2007 | Wynne et al. |
| 2010/0101449 | A1 | 4/2010 | Cornish et al. |
| 2015/0156973 | A1 | 6/2015 | Prinster et al. |
| 2016/0234997 | A1 | 8/2016 | Camacho |
| 2018/0133608 | A1 | 5/2018 | Young et al. |
| 2019/0116719 | A1 | 4/2019 | Fletcher et al. |

FOREIGN PATENT DOCUMENTS

| | | | | |
|---|---|---|---|---|
| GB | 2419076 | A * | 4/2006 | ............. A01C 11/00 |
| GB | 2419076 | A | 4/2006 | |
| KR | 20110033503 | A * | 3/2011 | ............... B64D 1/16 |
| WO | WO-2007033446 | A1 * | 3/2007 | ............. A01C 11/00 |
| WO | 2015148787 | A1 | 10/2015 | |
| WO | WO-2015148787 | A1 * | 10/2015 | ............... A01C 1/04 |
| WO | 2016049217 | A1 | 3/2016 | |
| WO | WO-2016049217 | A1 * | 3/2016 | ........... A01B 79/005 |

OTHER PUBLICATIONS https://www.youtube.com/watch?v=EkNdrTZ7CG4 "How Drones are Helping to Plant Trees"—Jun. 6, 2017 (Year: 2017).*

Ahtiainen, Marketta, The effects of forest clear-cutting and scarification on the water quality of small brooks, The Dynamics and Use of Lacustrine Ecosystems, vol. 79 of the series Developments in Hydrobiology, pp. 465-473 (1992).

Douglas, James E., The potential for water yield augmentation from forest management in the eastern United States, Journal of the American Water 5 Resources Association (JAWRA) 19(3):351-358 (1983).

Forestal, M. J., Altman, B. S., Cargile, J. D., & Hanchak, S. J., An empirical equation for penetration depth of osgive-nose projectiles into concrete targets, Proceedings of the Sixth International Symposium on Interaction of Nonnuclear Munitions with Structures, pp. 9-32. Panama City Beach, FL, May 3-7, 1993.

Montagnini, F., & Nair P.K.R., Carbon sequestration: An underexploited environmental benefit of agroforestry systems. In: Nair P.K.R., Rao M.R., Buck L.E. (eds) New Vistas in Agroforestry. Advances in Agroforestry, vol. 1. Springer, Dordrecht (2004).

Paliwal, D. P., et al., Effect of sowing orientations on the germination of pine seeds, current Science, 55:415-419 (1986).

Unified Facilities Criteria (UFC) 3-340-02, Structures to resist the effects of accidental explosions, Dec. 5, 2008, Change 2, Sep. 1, 2014.

Young, C. W., Penetration Equations, SAND97-2426, Sandia National Laboratories, Oct. 1997.

Office Action prepared by the US Patent and Trademark Office for U.S. Appl. No. 16/030,680, dated Apr. 4, 2019, pp. 1-9.

Final Office Action prepared by the US Patent and Trademark Office for U.S. Appl. No. 16/030,680, dated Jun. 12, 2019, pp. 1-10.

Office Action prepared by the US Patent and Trademark Office for U.S. Appl. No. 16/030,680, dated Oct. 4, 2019, pp. 1-11.

Final Office Action prepared by the US Patent and Trademark Office for U.S. Appl. No. 16/030,680, dated Mar. 2, 2020, pp. 1-7.

Office Action prepared by the US Patent and Trademark Office for U.S. Appl. No. 16/030,680, dated Jun. 8, 2020, pp. 1-16.

Final Office Action prepared by the US Patent and Trademark Office for U.S. Appl. No. 16/030,680, dated Dec. 24, 2020, pp. 1-12.

Office Action prepared by the US Patent and Trademark Office for U.S. Appl. No. 16/030,680, dated Jun. 24, 2021, pp. 1-14.

Final Office Action prepared by the US Patent and Trademark Office for U.S. Appl. No. 16/030,680, dated Dec. 22, 2021, pp. 1-9.

Office Action prepared by the US Patent and Trademark Office for U.S. Appl. No. 17/717,873 dated Dec. 22, 2022, pp. 1-8.

https://ntrs.nasa.gov/archive/nasa/casi .ntrs.nasa.gov/20100022158. pdf (ARES V: Progress Toward Unprecedented Heavy Lift by Phil Sumrail, Advanced Planning Manager, Ares Projects NASA Marshall Space Flight Center) (Year: 2010).

* cited by examiner

METHOD AND APPARATUS FOR AIRBORNE DISSEMINATION AND IMPLANTATION OF SEEDS

CROSS-REFERENCE TO RELATED APPLICATIONS

This application is a continuation of U.S. patent application Ser. No. 16/030,680 filed on Jul. 9, 2018, and entitled "METHOD AND APPARATUS FOR AIRBORNE DISSEMINATION AND IMPLANTATION OF SEEDS," which claims the benefit of U.S. Provisional Application Ser. No. 62/534,917 filed on Jul. 20, 2017, and entitled "METHOD AND APPARATUS FOR AIRBORNE DISSEMINATION AND IMPLANTATION OF SEEDS." The complete disclosures of the above applications are hereby incorporated by reference for all purpose.

BACKGROUND

This invention relates to a method and apparatus to enable the airborne dissemination and implantation of seeds. The objective is to provide an economical means of rapidly reforesting or replanting large areas of land. An aerodynamically shaped seed delivery apparatus with built-in nutrients, anti-pest, and/or anti-fungal properties can be disseminated rapidly from an airborne platform. The velocity of impact and depth of penetration into specific soil types by the delivery apparatus can be controlled up to a terminal velocity kinetic energy by exploiting a specified drag coefficient, nose coefficient for penetrability, mass, and altitude of release. The seeds are delivered and imbedded into the soil at the optimal depth and orientation to maximize germination rates, since seed orientation has a pronounced effect on germination and sprout mortality rates (Paliwal, D. P., et al.). Flight paths for Unmanned Aerial Vehicles (UAVs) utilized for dissemination can be automated to adjust coordinates based on wind vectors, terrain elevation data, and soil permeability data to efficiently achieve dissemination with a desired penetration depth across a specified geographic area.

Planting trees has traditionally been a labor intensive and manual process. It often takes years to complete and in the meantime the soil is eroding and losing nutrients, the wildlife habitat is degraded, and the water cycle is disrupted (Ahtiainen, M., & Douglas, J. E.). Although replanting is now required by law after clearcutting in most areas, vast areas in the U.S. were never properly replanted after logging many decades ago. Planting trees is also an economical and natural means of carbon sequestration (Montagnini, F., & Nair P. K. R.). Areas that have been logged or suffered from either a natural or man-made forest fire, or are unsafe/inaccessible to manual tree planting would benefit from an economical means of airborne dissemination and implantation of seeds. Although the foremost application of this invention is to benefit reforestation, the method and apparatus are extensible to seeds of other genus and species and can be utilized in other agricultural applications.

SUMMARY OF BENEFITS

Economical means of replanting large areas enables more reforestation

Automating the replanting process reduces manual labor

Rapid replanting can help prevent or reduce soil erosion and water quality disruption Reforesting returns surface water temperatures to normal and improves the water quality from forestry drainage Species habitat can be returned to normal more rapidly than with manual replanting Sequestration of carbon from the atmosphere is achieved naturally through reforesting.

BACKGROUND—PRIOR ART

In commercial agriculture, methods have been developed to improve crop yields by providing targeted supplemental nutrients, pest repellant, and fungicide either before or after planting.

Toth, et al., in U.S. Pat. No. 4,620,871, shows a method for improving agricultural yield using chemical supplementation prior to and after planting. While specific chemical supplementations to include nutrients may help agricultural yield by improving growth and be beneficial before or after planting, these are not required for utilization of the subject invention, but may be used in addition.

Ogawa, et al., in U.S. Pat. No. 9,504,250, shows a method of pest control to improve agricultural yield using chemical supplementation to areas where plants are grown. While specific chemical supplementations may help agricultural yield by controlling pests and be beneficial before or after planting, these are not required for utilization of the subject invention.

Gregory, et al., in U.S. Pat. No. 8,449,898, shows a method of controlling plant diseases caused by fungal plant pathogens using a composition of compounds including a fungicidal compound, when applied to plants, portions of plants, or to seeds. While specific supplementations may help agricultural yield by controlling fungal plant pathogens and be beneficial before or after planting, these are not required for utilization of the subject invention.

Several methods for deploying seeds or other payloads have also been developed, to include the utilization of UAVs to plant seeds in farming.

Arnold, in U.S. Pat. No. 4,333,265, shows a method of air dropping seedlings from a helicopter in containers that contain nutrients that are dropped and propelled into the earth in part by a velocity assist provided by the helicopter's own propellers. The disadvantages of this method include that saplings weigh much more than seeds and must be planted within a limited time after germination. Raising saplings adds cost per seed and they weigh more than seeds when disseminated thereby limiting the economic efficiency of this method.

Fima, et al., in U.S. Pat. No. 6,510,805, shows a method of aerial reforestation using a lighter-than-air airship system for the dispersal and planting of saplings. Lighter than air ships depend on atmospheric buoyancy for lift and depend on the containment of rare (e.g., helium) or in some cases volatile gases (e.g., hydrogen). Again, saplings weigh much more than seeds and must be planted within a limited time after germination. The system depends on mechanisms for storing and dispensing saplings, as well as piping and a reservoir for watering saplings. The dissemination of seeds from an airborne vehicle would be more economical due to a reduced weight and/or cost per germination.

Fima, in U.S. Pat. No. 6,516,565, shows a method of airborne seed delivery using a biodegradable container consisting of a spherical or conical pouch containing soil and nutrients that partially penetrates the ground upon impact. Since the pouches contain soil and nutrients they are more bulky and consist of more mass than necessary for seed delivery, which introduces some economical loss of efficiency. The pouches also do not exploit any unique aerodynamic properties to achieve a desired depth of penetration for seeds, nor does it permit maintaining a desired orientation for seeds to facilitate germination, nor does it leverage a maximum terminal velocity due to a specified mass and drag coefficient.

Thompson, in U.S. Pat. No. 6,832,604, shows that a pneumatic delivery system for projectiles could be adapted to deliver seedlings or seeds that are placed into containers. Although the focus of the system and claims are on the pneumatic apparatus, the pneumatic delivery of projectiles with seeds has potential. If the apparatus were mounted on a ground or air vehicle, the range could be extended from that of a stationary position. However, the containers as described do not exploit any unique aerodynamic properties to achieve a desired depth of penetration for seeds, nor does it permit maintaining a desired orientation for seeds to facilitate germination, nor does it leverage a maximum terminal velocity due to a specified mass and drag coefficient.

Buchmueller, in U.S. Pat. No. 9,676,481, shows that airborne delivery of an item can be provided by an unmanned aerial vehicle (UAV) with a tether. Although the focus of the system is on the inertial dynamics between the UAV and the item attached to the tether, the item could be a seed. However, the item as described does not exploit any unique aerodynamic properties to achieve a desired depth of penetration for seeds, nor does it permit maintaining a desired orientation for seeds to facilitate germination, nor does it leverage a maximum terminal velocity due to a specified mass and drag coefficient.

Haskin, in U.S. Pat. No. 9,650,136, shows that a package can be delivered by a UAV whereby the package is lowered with a tether and a cable is released. This system focuses on methods for delivery of the payload and releasing or severing the tether or cable. However, the payload as described does not exploit any unique aerodynamic properties to achieve a desired depth of penetration for seeds, nor does it permit maintaining a desired orientation for seeds to facilitate germination, nor does it leverage a maximum terminal velocity due to a specified mass and drag coefficient.

Neal, in U.S. Pat. No. 9,703,295, shows that during descent of a payload, which is specifically a sonobuoy, descent can be controlled by on-board management of a plurality of control surfaces. Even if this approach could be applied to seeds, the addition of dynamic control surfaces on individual seeds would not be economical with today's technology for agricultural purposes where the cost per seed must be minimized to achieve high efficiency.

Burema, et al., in U.S. Pat. No. 9,382,003, shows an aerial farm robot that can be used to plant seeds, utilizing a drill to make holes in the ground and a reservoir for seeds. This approach uses mechanical energy to make a hole in the ground of a desired depth rather than gravitational energy to achieve a desired kinetic energy in the form of velocity to achieve a desired implantation depth due to soil penetration. While the mechanical approach overcomes any potential variability in the penetrability of soil, it limits the distribution to one hole at a time, and requires a deliberate amount of time and energy be expended for each seed planted. It also does not allow for the control of the orientation of the seeds when planted, which can improve germination rates with some species. Finally, this approach precludes the rapid dissemination of a large number of seeds over a large area, which would provide a more economical cost per seed.

In conclusion, no method or process has been formerly developed for an aerodynamically shaped seed delivery apparatus with built-in nutrients, anti-pest, and anti-fungal protection that can be disseminated rapidly from an airborne platform with a controlled velocity of impact and depth of penetration into specific soil types via exploitation of a specified drag coefficient, nose coefficient for penetrability, mass, and altitude of release, while delivering seeds into the soil at an optimal depth and orientation to maximize germination rates

SUMMARY

First, an aerodynamic seed delivery apparatus must be sufficiently large enough to hold the payload. Some seeds are generally spherical but many are not and have a length that differs from width. The body of the apparatus is recommended to have a diameter at least twice that of the diameter of the seed around the axis of the radicle. And for long seeds on the axis of the radicle, the length of the apparatus should be at least twice the length, although in most cases the apparatus length (or height) will be several times longer.

The apparatus is also designed to fall in one direction, i.e., head first, with a head, tail, and body. This is accomplished by having a center of mass towards the head and a tail that has more surface area and drag than the head. In this manner, the apparatus can be released in any orientation and when released from a sufficient height always land head first.

The orientation of the apparatus upon penetration of the soil is important so that the orientation of the seed can be deliberately controlled. Especially for some trees (e.g., genus *Pinus*) the germination and mortality rates are dependent on the orientation of the radicle upon implantation in the soil. The orientation of the seed radicle can be determined by placing the seed in the desired orientation when the apparatus is formed. For instance, if the apparatus is formed primarily out of a sterilized clay media with nutrients, fungicidal compounds, and/or pest repellants, a form can be used to shape the media into two halves of the apparatus, then the seed can be placed on one of these halves and then the halves can be joined sealing the seed inside.

The maximum depth of penetration of an aerodynamic seed delivery apparatus can be determined leveraging the terminal velocity and soil penetration equations which introduce additional parameters for the nose performance and the penetrability of a target soil. The terminal velocity (V) of the apparatus can be calculated as follows:

$$V = sqrt(2mg/pAC)$$

where V is the terminal velocity, m is the mass, g is the acceleration due to gravity, C is the drag coefficient, p is the density of atmospheric gas, and A is the cross-section of the apparatus.

The maximum kinetic energy (KE) of the apparatus can be calculated using the m and V as follows:

$$KE = 1/2 * mV^2$$

Per Young, C. W., the depth of penetration (D) of the apparatus can be calculated for any velocity (v) as follows:

For $v < 61$ m/s:

-continued
$$D = 0.0008 SN(m/A)^{07} \ln(1 + 2.15v^2 10^{-4})$$

For $v >= 61$ m/s:

$$D = 0.000018 SN(m/A)^{07}(v - 30.5)$$

where S is the penetrability of the target soil and N is the nose performance coefficient. Ranges of s were defined by Young, C. W., as follows:

S Target Description 2-4 Dense, dry, cemented sand. Dry caliche. Massive gypsite and selenite deposits.

4-6 Gravel deposits. Sand without cementation. Very stiff and dry clay.

6-9 Moderately dense to loose sand, no cementation, water content not important.

8-10 Soil fill material, with the s-number range depending on compaction.

5-10 Silt and clay, low to medium moisture content, stiff. Water content dominates penetrability.

10-20 Silt and clay, moist to wet. Topsoil, loose to very loose. 20-30 Very soft, saturated clay. Very low shear strength.

30-60 Clay marine sediments, either currently (Gulf of Mexico) or recent geologically (mud deposits near Wendover, Utah).

>60 It is likely that the penetration equations do not apply.

The unitless nose performance coefficient N is utilized by Young, C. W. and Forestal, M. J., et al. The nose shape of projectiles and fragments from explosives is also applicable to the design of hardened structures and the penetration and damage analysis of structures (Unified Facilities Criteria (UFC) 3-340-02). For tangent ogive nose shapes the following equation is used:

$$N = 0.18 L_n/d + 0.56$$

where $L_n$ is the length of the nose and d is the diameter. For conic nose shapes the following is used:

$$N = 0.25 L_n/d + 0.56$$

For nose shapes other than conic or ogive, the following is used:

$$N = 0.125(L_n + L'_n)/d + 0.56$$

where $L_n'$ is the actual nose length reduced by blunting. If blunting is more than 10% of the diameter, the following is used:

$$N = 0.09(L_n + L'_n)/d + 0.56$$

Thus, the m, A, and N of simple or compound apparatus designs can be adjusted to achieve a desired terminal velocity, kinetic energy, and depth of penetration for a specified soil permeability. Furthermore, the velocity at impact which determines the kinetic energy and in part the depth of penetration for a specified soil permeability can be controlled by releasing the aerodynamic seed delivery apparatus at different elevations above the target soil.

For instance, consider a generic seed of width 3.5 mm and length 6.0 mm, with an optimal planting depth of 2.5 cm. This can fit in a simple aerodynamic seed delivery apparatus formed from a primarily clay media with a mass of 0.58 g, cross-section of 38.5 mm$^2$, having a terminal velocity of 77.7 m/s, providing a penetration depth of 2.5 cm in S=6 soil when released elevations exceeding 300 m above the soil. Although this depth may be ideal for S=6 soil, for S=15 the penetration depth at terminal velocity would be 6.3 cm, which is much more than required. To utilize this apparatus configuration with S=15 soil, the apparatus would be released at a lower altitude, i.e., 125 m above the soil, to achieve a controlled velocity of 49.2 m/s on impact which would provide a 2.5 cm penetration depth.

Furthermore, as a specific example, consider the slightly larger pine seed of Pinus ponderosa, which has a mean width of 4.9 mm and length of 7.6 mm, with an optimal planting depth of 1.3 cm. The cross-section and mass of an apparatus can be easily identified once a target altitude and soil penetrability are specified. For instance, if we wish to disseminate these from 300 m to 9.8 km of altitude for a terminal velocity implantation into soil with S=6 penetrability, with a penetration depth of 1.3 cm, this can be provided by a simple apparatus with a hemispherical head of radius 4 mm, body of height 2 mm and tail of length 8 mm with a weight of 0.47 g, and a cross-section of 50.3 mm$^2$, which has a terminal velocity of 61.4 m/s with the desired penetration characteristics.

Alternative configurations of the apparatus can be used to vary m, c, N, and A, and these can be arranged to provide either a similar or some other unique penetration performance depending on a desired release altitude and the target soil penetrability. The geometry of the head of the simple apparatus can be modified, or a compound version of the head with multiple segments each with a unique geometry can provide alternatives for modifying each of these variables. The body geometry can be varied to alter m, C, and A. The geometry of the simple tail can also be modified to include a compound configuration with multiple segments each with unique geometric properties to alter the m, C, and A. (Note: modification of the body or tail does not alter N.)

UAV configured with a reservoir of aerodynamic seed delivery apparatus and a mechanism to release either individual or a plurality of apparatus in a stream at a predetermined rate can be configured with a flight path to disseminate a specified density of apparatus over a defined area for implantation. The flight path can be adjusted for variable ground elevation data, either utilizing digital terrain elevation data for the defined area or an onboard sensor to detect a real-time height over the ground surface. The flight path elevation can also be adjusted to allow for variable soil penetrability over the defined area. The flight path can also be adjusted in real-time with wind vector data to correct for the effect the wind will have on the trajectory of the apparatus after release. Energy utilization by the UAV can be minimized by precluding unnecessary altitude changes during dissemination by configuring the flight path for a dissemination to complete all apparatus releases required for one elevation in a near continuous stream on a contoured flight path before changing elevation to complete dissemination at a different altitude as required due to variable terrain elevation or soil penetrability. Also, the lowest altitude disseminations can be completed first to preclude expending energy to lift delivery apparatus to an altitude where they will not be disseminated.

DRAWINGS—FIGURES

FIG. 2a is a bottom view of the Seed Delivery Apparatus of FIG. 1a.

FIG. 2c is a top view of the Seed Delivery Apparatus of FIG. 1a.

FIG. 3a is a lower front perspective view of the Seed Delivery Apparatus of FIG. 1a.

FIG. 4a is a vertical cross-sectional view of the Seed Delivery Apparatus of FIG. 1a.

DETAILED DESCRIPTION

Figure 1A:
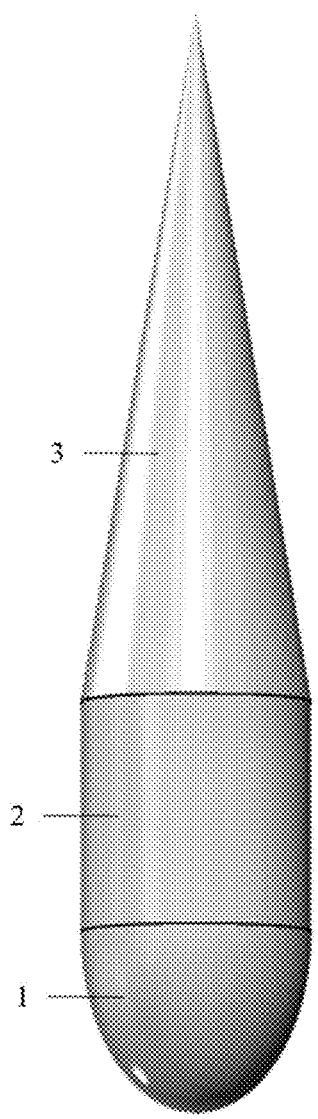
FIG. 1a is a front view of an example of a Seed Delivery Apparatus.
Figure 1B:
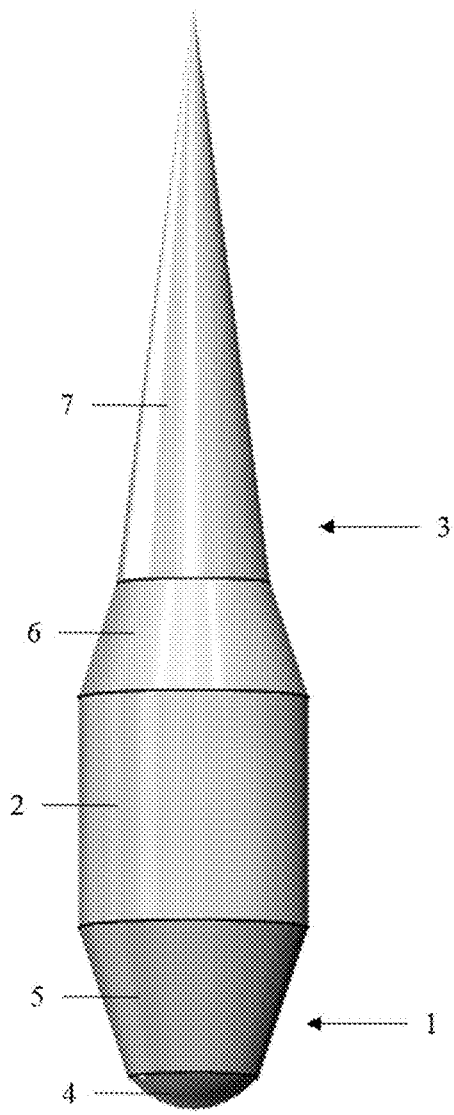
FIG. 1b is a front view of another example of a Seed Delivery Apparatus.

FIG. 1a is a front view of a simple example of a Seed Delivery Apparatus ("simple apparatus"). FIG. 1b is a front view of a compound example of the Seed Delivery Apparatus ("compound apparatus"). The head 1 of the apparatus in FIG. 1a is hemiellipsoid with height $h_1$ and diameter $d_1$, but depending on the desired drag coefficient, it could also be a hemisphere or cone, or other geometrical shape (e.g., a pyramid or a trapezoidal prism). In FIG. 1a, the geometry of 1 matches the geometry of the body 2, where they connect, both being circular, where 2 is a cylinder of height $h_2$ and diameter $d_1$ and having the same diameter as 1. The last part of the simple apparatus is the tail 3, which is a cone in FIG. 1a, has height $h_3$ and diameter $d_1$, and is connected to the body with the same geometry and diameter as 2. In FIG. 1b, the compound apparatus also has 1, 2, and 3, however 1 consists of a plurality of segments, with the first segment of the head 4 being connected to the second segment of the head 5 which is connected to 2. Each segment of the head may have a slightly different geometry based on the desired drag coefficient of the apparatus, and in FIG. 1b, 4 is a truncated hemisphere with a height $h_4$ and diameter $d_4$ while 5 is a truncated cone with a height $h_5$, a minimum diameter of $d_4$ and a maximum diameter of $d_5$. No matter how many segments a head has, they all have matching geometries where they connect and the last segment connects to 2 with the same geometry of 2. In FIG. 1b, the compound apparatus also has a segmented 3 consisting of the first segment of the tail 6, and the second segment of the tail 7. The 6 is a truncated cone with a height $h_6$, a maximum diameter of $d_1$ and a minimum diameter of $d_6$, and 6 is connected to 2 with the same geometry. The 7 is a cone with a maximum diameter of $d_6$ and a height of $h_7$. Generally, $h_1 >= 0$, $h_2 >= 0$, and $h_3 >= d_1$, while typically, $h_1 >= d_1$, $h_2 >= d_1$, and $h_3 >= 2d_1$, so that the apparatus falls with 1 pointed down and 3 pointed up due to a forward center of gravity (i.e., towards 1) and air resistance that pushes 3 up. Despite the dimensions, geometries, and aerodynamics of the apparatus, these components, 1, 2, and 3, are comprised of a media consisting of a compound, preferably organic, such as clay or compressed sand, but not necessarily so. The media, especially if organic, should always be sterilized to preclude the risk of spreading pathogens to different geographic regions. This media may also contain one or more fertilizers and/or micronutrients to facilitate germination and early growth, as well as one or more fungicidal components. Compounds may also be included in the media to dissuade pests from collecting them, such as a coloring agent or compounds with an unpleasant taste. Alternatively, the nutrients, fungicidal compounds, and/or pest repellants may be applied as a coating to the apparatus. The volume of the apparatus can be calculated using simple volumetric formulas for each of 1, 2, and 3, to include segments if compound.

Figure 2C:
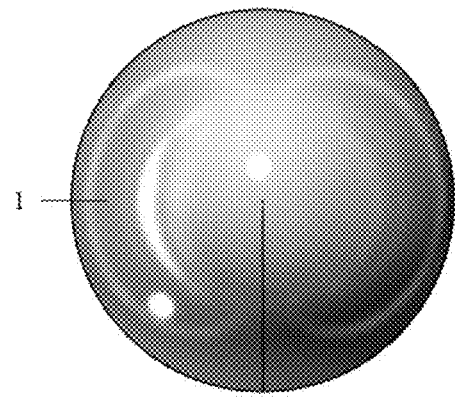
Figure 2D:
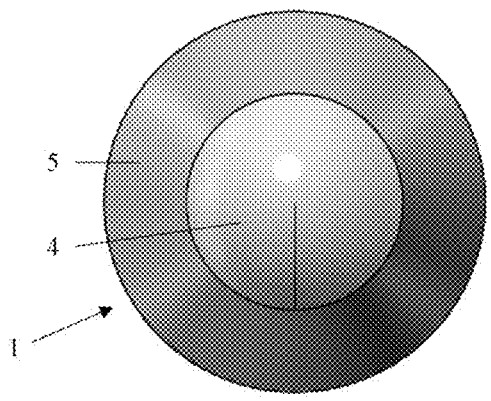
FIG. 2d is a top view of the Seed Delivery Apparatus of FIG. 1b.
Figure 2A:
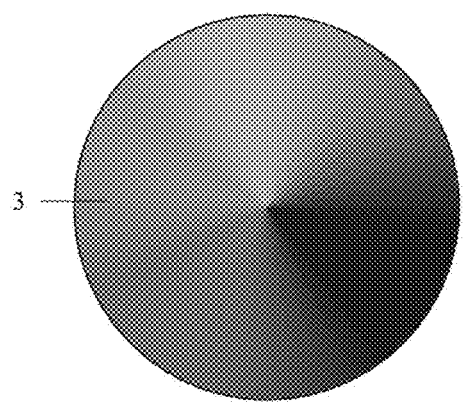
Figure 2B:
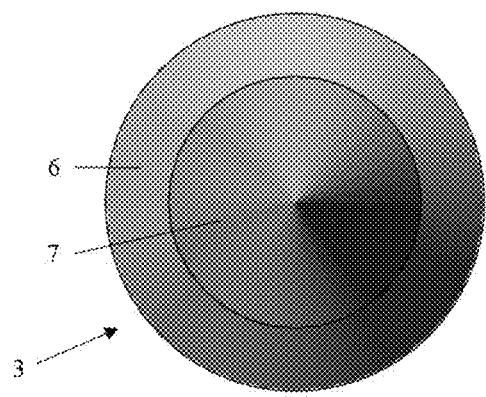
FIG. 2b is a bottom view of the Seed Delivery Apparatus of FIG. 1b.

FIG. 2a is a bottom view of the simple apparatus. FIG. 2b is a bottom view of the compound apparatus. FIG. 2c is a top view of the simple apparatus. FIG. 2d is a top view of the compound apparatus. On the bottom view of the simple apparatus (FIG. 2a), only the hemiellipsoid 1 is visible. On the head of the compound apparatus (FIG. 2b), two segments of 1 are visible, as the truncated sphere 4 appears in the center of the truncated cone 5 on 1. On the top view of the simple apparatus (FIG. 2c), only the conical 3 is visible. On the top view of the compound apparatus (FIG. 2d), two segments of 3 are visible, as the conical 7 appears in the middle of the truncated cone 6 on 3.

Figure 3A:
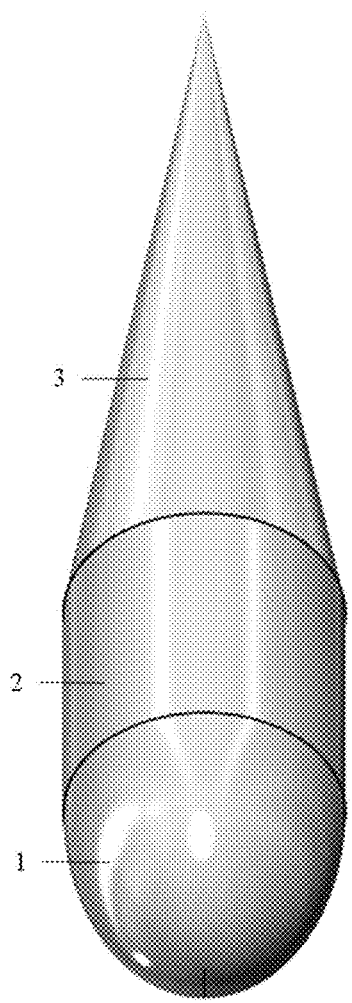
Figure 3B:
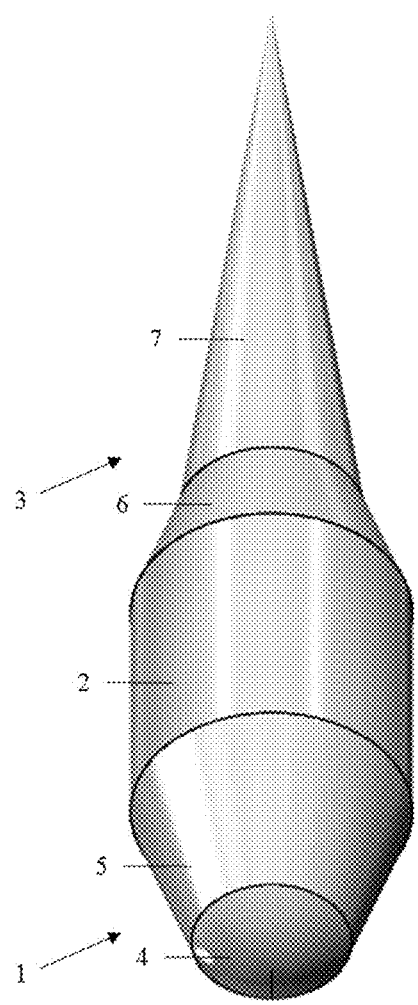
FIG. 3b is a lower front perspective view of the Seed Delivery Apparatus of FIG. 1b.

FIG. 3a is a lower front perspective view of the simple apparatus. FIG. 3b is a lower front perspective view of the compound apparatus. On the simple apparatus perspective view (FIG. 3a), the hemiellipsoid 1 appears below and connected to the cylindrical 2 and 2 is below and connected to the conical 3. On the compound apparatus perspective view (FIG. 3b), 1 consists of two segments, including the truncated sphere 4 which appears below and connected to the center of the truncated cone 5 on 1. The truncated cone 5 is below and connected to the cylindrical 2. The 3 consists of two segments, including the conical 7 which appears above and connected to the truncated cone 6 on 3, while 6 is above and connected to 2.

Figure 4A:
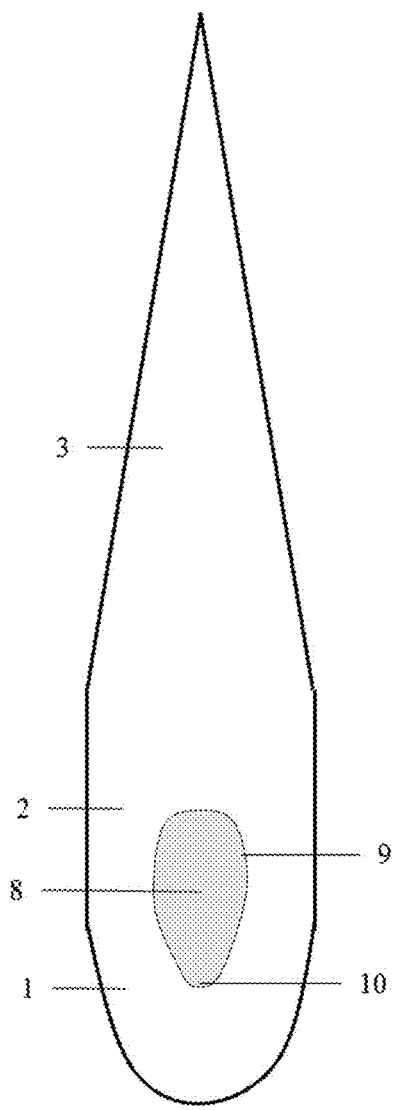
Figure 4B:
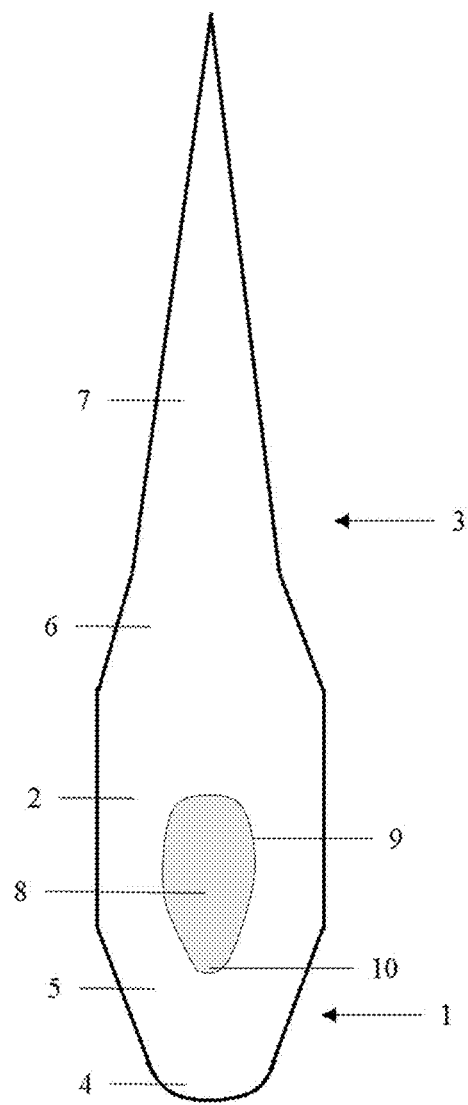
FIG. 4b is a vertical cross-sectional view of the Seed Delivery Apparatus of FIG. 1b.

FIG. 4a is a vertical cross-sectional view of the simple apparatus. FIG. 4b is a vertical cross-sectional view of the compound apparatus. In the simple apparatus cross-sectional view (FIG. 4a), the outline of the hemiellipsoid 1, the cylindrical 2, and the conical 3 are visible with 1 at the bottom, 2 in the middle, and 3 at the top. Centered inside of the apparatus the seed 8 is visible with the seed coat 9 and radicle 10 oriented to point down towards 1. The optimal orientation of 10 for genus *Pinus* is down (Paliwal, D. P., et al.) and will be down for most species since this is where the root originates, however, 8 could be oriented with 10 at a different angle within the apparatus if advantageous for other genus or species. In the compound apparatus cross-sectional view (FIG. 4b), the outline of the two segments of 1, the cylindrical 2, and the two segments of 3 are visible with 1 at the bottom, 2 in the middle, and 3 at the top. In this example, 1 consists of two segments, including the truncated sphere 4 which appears below and connected to the center of the truncated cone 5 on 1. The truncated cone 5 is below and connected to the cylindrical 2. The 3 consists of two segments, including the conical 7 which appears above and connected to the truncated cone 6 on 3, while 6 is above and connected to 2. Also visible centered inside of the apparatus is 8 with 9 and 10 oriented to point down towards 1.

Figure 5A:
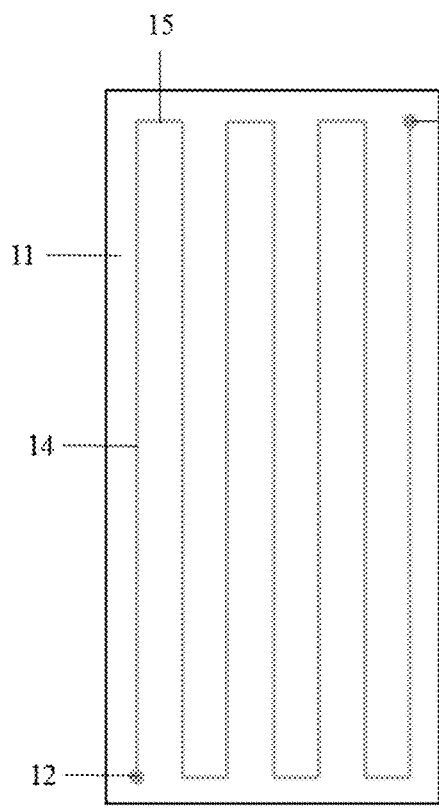
FIG. 5a is a top view of a constant elevation course.
Figure 5B:
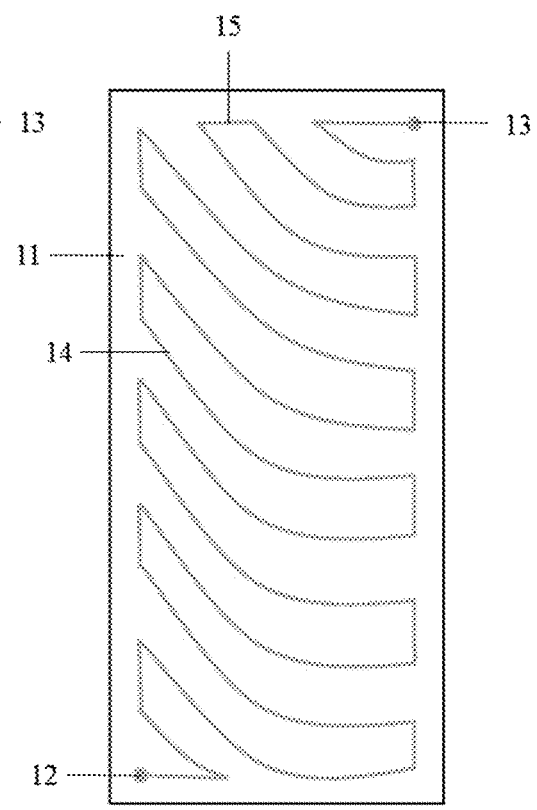
FIG. 5b is a top view of a contoured elevation course.

FIG. 5a is a top view of a constant elevation course. FIG. 5b is a top view of a contoured elevation course. An example of a rectangular geographic target area for dissemination and implantation 11 is shown in FIG. 5a. This area can be covered by a continuous flight path with a start point 12 and end point 13, which consists of a one or more long tracks 14 which are connected by short tracks 15. In this example, 14 and 15 are linear and 14 are latitudinal while 15 is longitudinal. The direction of 14 and 15 could be any angle, with generally 14 being parallel. With such a flight path, any contiguous area could be covered by an aerial vehicle with a dissemination apparatus configured to release the Aerodynamic Seed Delivery Apparatus at a rate desired, either individually or in a stream, depending on the density of implantation desired. A mechanism to release either singular, plural, or a control valve to release a stream from a reservoir constitute means to enable and disable release of the Aerodynamic Seed Delivery Apparatus. Such a dissemination apparatus would have a specified area of coverage, or area that the Aerodynamic Seed Delivery Apparatus could be disseminated to from one coordinate above 11, and this area of coverage could be variable depending on the elevation of the aerial vehicle above 11. In this example, 11 is assumed to be of a constant elevation and penetrability such that the elevation of the aerial vehicle can be constant throughout all 14 and 15 from 12 to 13. For this flight path, generally, A=2rnl and h=2r where A is the area to be covered (or the area of 11), r is the radius of dissemination from the vehicle, and l is the length 14, n is the quantity of 14. If the lengths of 14 are not the same, and the 14 are numbered 1 to n, let $l_1$=the length of the long path i, then generally A=2r*sum($l_1$) with i=1 to n. The elevation of this flight path above 11 would depend on the desired kinetic energy of the Seed Delivery Apparatus to achieve a desired depth of penetration given the soil penetrability. FIG. 5b also shows an example of a rectangular geographic target area 11. This area can also be covered by a continuous flight path from 12 to 13, which consists of multiple 14 which are connected by 15. However, in this example either the elevation or penetrability, or both, are variable across 11. To efficiently utilize and conserve aerial vehicle energy, changes in elevation should be minimized, and each individual 14 has a constant elevation, while each 15 would include any required elevation changes, so that for a majority of the time the aerial vehicle is operating at constant elevations between 12 and 13. Also, the lowest altitude disseminations can be completed first to preclude expending energy to lift delivery apparatus to an altitude where they will not be disseminated. Together these methods optimize energy utilization by the aerial vehicle. In this example, each 14 consists of a curved path with a constant elevation as required by the elevation and penetrability of 11, while each 15 includes any required elevation changes between individual tracks of 14.

DRAWINGS—REFERENCE NUMERALS 1 head
2 body
3 tail
4 first segment of head
5 second segment of head
6 first segment of tail
7 second segment of tail
8 seed
9 seedcoat
10 radicle
11 target area for dissemination and implantation
12 start of flight path
13 end of flight path
14 long track on flight path
15 short track on flight path Operation The operation for the airborne dissemination and implantation of seeds utilizing aerodynamic seed delivery apparatus includes the development and production of said apparatus configurations for the delivery of seeds of different genus and species, identifying specifications for the release of said apparatus for various soil penetrability in order to achieve optimal implantation depths, and the automation of efficient UAV flight paths for the efficient and effective dissemination of said apparatus across specified areas.

1. Once a genus and species is selected for dissemination, the specified seed width, length, mass, optimal germination orientation, and recommended implantation depth are utilized to identify an optimal simple or compound apparatus targeted for implantation to a soil of specified penetrability;

2. Media for the apparatus is identified, including a composition of materials that may include inert, nutrients, anti-fungal, and/or anti-pest components, and the density for this media is specified;

3. The dimensions and geometry for the head, body, and tail, utilizing the specified media density is determined providing a predetermined gross mass (m) drag coefficient (C), nose performance coefficient (N), cross-section (A), terminal velocity (v), and a minimum elevation above the ground required for said terminal velocity of the apparatus;

4. A form for the specified apparatus can be produced utilizing the apparatus dimensions;

5. Automated production of delivery apparatus utilizing said form, media, and seeds;

6. Apparatus may optionally be coated with nutrients, anti-fungal, and/or anti-pest components;

7. Said apparatus may be disseminated by any aerial vehicle including UAVs from specified altitudes as required for specified ground elevation and soil penetrability;

8. Flight paths for UAV may be optimized by identifying a series of parallel or contoured tracks of continuous elevation as required by terrain elevation and/or soil penetrability and completing segments of minimal altitude first to preclude unnecessary lifting of mass.

REFERENCES CITED

U.S. Patent Documents

| | | | |
|---|---|---|---|
| 4,333,265 | June 1982 | Arnold, R. L. | 47/74 |
| 4,620,871 | November 1986 | Toth, et al. | 504/137 |
| 6,510,805 | January 2003 | Fima, et al. | 111/100 |
| 6,516,565 | February 2003 | Fima et al. | 47/74 |
| 6,832,604 | December 2004 | Thompson, P. | 124/75 |
| 8,449,898 | May 2013 | Gregory, et al. | 424/405 |
| 9,382,003 | July 2016 | Burema, et al. | 1/1 |
| 9,504,250 | November 2016 | Ogawa et al. | 1/1 |
| 9,560,136 | May 2017 | Haskin et al. | 1/1 |
| 9,676,481 | June 2017 | Buchmueller, D. | 1/1 |
| 9,703,295 | July 2017 | Neal, et al. | 1/1 |

Other Publications

Ahtiainen, Marketta, The effects of forest clear-cutting and scarification on the water quality of small brooks, The Dynamics and Use of Lacustrine Ecosystems, Volume 79 of the series Developments in Hydrobiology, pp 465-473 (1992).

Douglas, James E., The potential for water yield augmentation from forest management in the eastern United States, Journal of the American Water Resources Association (JAWRA) 19(3):351-358 (1983).

Forestal, M. J., Altman, B. S., Cargile, J. D., & Hanchak, S. J., An empirical equation for penetration depth of osgive-nose projectiles into concrete targets, Proceedings of the Sixth International Symposium on Interaction of Non-nuclear Munitions with Structures, pp. 9-32. Panama City Beach, Fla., May 3-7, 1993.

Montagnini, F., & Nair P. K. R., Carbon sequestration: An underexploited environmental benefit of agroforestry systems. In: Nair P. K. R., Rao M. R., Buck L. E. (eds) New Vistas in Agroforestry. Advances in Agroforestry, vol 1. Springer, Dordrecht (2004).

Paliwal, D. P., et al., Effect of sowing orientations on the germination of pine seeds, current Science, 55:415-419 (1986).

Unified Facilities Criteria (UFC)3-340-02, Structures to resist the effects of accidental explosions, 5 Dec. 2008, Change 2, 1 September 2014.

Young, C. W., Penetration Equations, SAND97-2426, Sandia National Laboratories, October 1997.

What is claimed is:

1. A method of disseminating seeds on a delineated geographic area via an Unmanned Aerial Vehicle (UAV) having a dissemination apparatus with means to enable and disable release of a plurality of aerodynamic seed delivery apparatuses from said dissemination apparatus, the method comprising:
   a. providing the plurality of aerodynamic seed delivery apparatuses, one or more of the plurality of aerodynamic seed delivery apparatuses including:
      a head having a hemi-ellipsoid shape, the head includes first and second segments, wherein the first segment has the hemi-ellipsoid shape and the second segment has a frustoconical shape,
      a tail having a conical shape with a base and a tip,
      a body having a cylindrical shape, the entirety of the body being disposed between and attached to the head and the tail, and
      at least one seed encapsulated in at least one of the head or the cylindrical body, wherein the one or more of the plurality of aerodynamic seed delivery apparatuses have a center of mass that is adjacent the head and spaced from the tail such that the one or more of the plurality of aerodynamic seed delivery apparatuses fall headfirst to the ground;
   b. specifying a predetermined rate of release of said plurality of aerodynamic seed delivery apparatuses;
   c. specifying a predetermined area of coverage for said plurality of aerodynamic seed delivery apparatuses from a coordinate above said delineated geographic area,
   d. specifying a depth of implantation desired for said plurality of aerodynamic seed delivery apparatuses on said delineated geographic area;
   e. specifying a penetrability of the target soil within said delineated geographic area;
   f. specifying a density of seed distribution desired on said delineated geographic area; and
   g. spanning said delineated geographic area with said UAV, wherein the spanning includes releasing the plurality of aerodynamic seed delivery apparatuses from an elevation above said target soil such that sufficient velocity is achieved to ensure said specified depth of implantation is achieved throughout said delineated geographic area at said density of seed distribution by utilizing said means to enable and disable release.

2. The method according to claim 1, further comprising:
   a. controlling, by at least one computing device of the UAV, a flight path of the UAV; and
   b. adjusting, by the at least one computing device, the flight path of the UAV based on wind velocity, such that said plurality of aerodynamic seed delivery apparatuses are released at correct coordinates within said delineated geographic area to achieve implantation throughout said delineated geographic area at said density of seed distribution.

3. The method according to claim 1, further comprising:
   a. controlling, by at least one computing device of the UAV, a flight path of the UAV; and
   b. adjusting, by the at least one computing device, the flight path of the UAV based on ground elevation data such that said plurality of aerodynamic seed delivery apparatuses are released at correct elevations within said delineated geographic area to achieve implantation throughout said delineated geographic area at said density of seed distribution.

4. The method according to claim 1, further comprising:
   a. controlling, by at least one computing device of the UAV, a flight path of the UAV; and
   b. adjusting, by the at least one computing device, the flight path of the UAV based on detected elevation data received from a ground elevation sensor on the UAV such that said plurality of aerodynamic seed delivery apparatuses are released at correct elevations within said delineated geographic area to achieve implantation throughout said delineated geographic area at said density of seed distribution.

5. The method according to claim 1, further comprising:
   a. controlling, by at least one computing device of the UAV, a flight path of the UAV; and
   b. adjusting, by the at least one computing device, the flight path of the UAV based on ground penetrability data for said delineated geographic area such that said plurality of aerodynamic seed delivery apparatuses are released at correct elevations within said delineated geographic area to achieve implantation throughout said delineated geographic area at said density of seed distribution.

6. The method according to claim 1, wherein the hemi-ellipsoid shape of the first segment has a first maximum diameter and a first height, and wherein the first height is not less than the first maximum diameter.

7. The method according to claim 6, wherein the frustoconical shape of the second segment has a second maximum diameter and a second height, and wherein the second height is not less than the first maximum diameter.

8. The method according to claim 6, wherein the tail has a tail height, and wherein the tail height is not less than the first maximum diameter.

9. The method according to claim 8, wherein the tail has a tail diameter and the body has a body diameter, and wherein the tail diameter is equal to or less than the body diameter.

10. A method of disseminating seeds on a delineated geographic area via an Unmanned Aerial Vehicle (UAV) having a dissemination apparatus with means to enable and disable release of a plurality of aerodynamic seed delivery apparatuses from said dissemination apparatus, the method comprising:

a. providing the plurality of aerodynamic seed delivery apparatuses, one or more of the plurality of aerodynamic seed delivery apparatuses including:
   a head having an aerodynamic hemi-ellipsoid shape for a predetermined soil penetrability, the head includes first and second segments, wherein the first segment has the hemi-ellipsoid shape with a first maximum diameter and a first height, where the first height is not less than the first maximum diameter, and the second segment has a frustoconical shape with a second maximum diameter and a second height, where the second height is not less than the first maximum diameter, and the head has a nose performance coefficient for a predetermined depth of penetration for a seed,
   a tail having a conical shape with a base, a tip, a tail height, and a tail diameter, the tail height is not less than the first maximum diameter,
   a body having a cylindrical shape and a body diameter, the body is disposed between and attached to the head and the tail, wherein said head and tail are at opposing ends, with the entirety of the cylindrical body positioned between said head and tail, the base of the tail is adjacent to the body and the tip is opposite to the base, wherein the tail diameter is equal to or less than the body diameter, and
   at least one seed encapsulated in at least one of the head or the cylindrical body, wherein the one or more of the plurality of aerodynamic seed delivery apparatuses have a center of mass that is adjacent the head and spaced from the tail such that the one or more of the plurality of aerodynamic seed delivery apparatuses fall headfirst to the ground;
b. specifying a predetermined rate of release of said plurality of aerodynamic seed delivery apparatuses;
c. specifying a predetermined area of coverage for said plurality of aerodynamic seed delivery apparatuses from a coordinate above said delineated geographic area,
d. specifying a depth of implantation desired for said plurality of aerodynamic seed delivery apparatuses on said delineated geographic area;
e. specifying a penetrability of the target soil within said delineated geographic area;
f. specifying a density of seed distribution desired on said delineated geographic area; and
g. spanning said delineated geographic area with said UAV, wherein the spanning includes releasing the plurality of aerodynamic seed delivery apparatuses from an elevation above said target soil such that sufficient velocity is achieved to ensure said specified depth of implantation is achieved throughout said delineated geographic area at said density of seed distribution by utilizing said means to enable and disable release.

11. The method of claim 10, wherein the head and the tail are aligned along one axis.

* * * * *